US007596584B2

(12) United States Patent
Copeland et al.

(10) Patent No.: US 7,596,584 B2
(45) Date of Patent: Sep. 29, 2009

(54) PREDICATE BASED GROUP MANAGEMENT

(75) Inventors: George Prentice Copeland, Redmond, WA (US); Yong Lu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 349 days.

(21) Appl. No.: 11/789,603

(22) Filed: Apr. 25, 2007

(65) Prior Publication Data

US 2008/0270339 A1  Oct. 30, 2008

(51) Int. Cl.
  *G06F 17/30* (2006.01)
(52) U.S. Cl. ............... 707/104.1; 707/3; 707/10; 707/102
(58) Field of Classification Search ....... 707/104.1, 707/102, 10, 3
  See application file for complete search history.

(56) References Cited

U.S. PATENT DOCUMENTS

| | | | |
|---|---|---|---|
| 5,999,978 A | 12/1999 | Angal et al. | |
| 6,212,511 B1 | 4/2001 | Fisher et al. | |
| 6,226,745 B1 | 5/2001 | Wiederhold | |
| 6,360,217 B1 | 3/2002 | Gopal et al. | |
| 6,564,212 B2 * | 5/2003 | Koskas | 707/3 |
| 6,578,037 B1 | 6/2003 | Wong et al. | |
| 7,107,282 B1 * | 9/2006 | Yalamanchi | 707/102 |
| 7,127,467 B2 * | 10/2006 | Yalamanchi et al. | 707/102 |
| 7,536,396 B2 * | 5/2009 | Johnson et al. | 707/100 |
| 2003/0220946 A1 | 11/2003 | Malik | |
| 2004/0107180 A1 | 6/2004 | Yoshida | |
| 2004/0254934 A1 | 12/2004 | Ho et al. | |
| 2005/0282800 A1 | 12/2005 | Tolf et al. | |
| 2006/0041458 A1 | 2/2006 | Ringrose et al. | |

OTHER PUBLICATIONS

Kuhn et al., Cost effective use of formal methods in vertication and validation, 2001.*
Morris Sloman, "Policy Driven Management for Distributed Systems," Journal of Network and Systems Management, Dec. 1994, pp. 333-360, http://wwwsnmp.cs.utwente.nl/Docs/bibliography/articles/general/slo9301.ps.
Kumar et al., "Context Sensitivity in Role-based Access Control," ACM SIGOPS Operating Systems Review, Jul. 2002, pp. 53-66, http://delivery.acm.org/10.1145/570000/567336/p53-kumar.pdf?key1=567336&key2=2515955711&col1=ACM&dl=ACM&CFID=75919783&CF.

* cited by examiner

*Primary Examiner*—Jean M Corrielus
(74) *Attorney, Agent, or Firm*—Merchant & Gould LLC

(57) ABSTRACT

Embodiments are provided to generate an integrated data structure. In an embodiment, a database system is configured to generate an integrated database view that includes a number of predicate-based objects and a number of enumerated objects. A declarative membership criteria can be used to provide automatic membership to a group of objects associated with the database system. A number of predicate-based group membership rules can be used when generating a database view that includes a number of predicate-based views and a number of enumerated groups.

12 Claims, 4 Drawing Sheets

US 7,596,584 B2

PREDICATE BASED GROUP MANAGEMENT

COPYRIGHT NOTICE

A portion of the disclosure of this patent document contains material, which is subject to copyright protection. The copyright owner has no objection to the facsimile reproduction by anyone of the patent document or patent disclosure as it appears in the U.S. Patent and Trademark Office patent file or records, but otherwise reserves all copyright rights whatsoever.

BACKGROUND

Businesses and other organizations routinely maintain large amounts of records, data, and other information. An organization may use some type of database system to manage and maintain sales information, employee records, equipment types and locations, access rights, etc. Correspondingly, the organization expects to use the database system effectively by quickly and efficiently updating information contained therein. Unfortunately, many database systems are not configured to expeditiously update information. For example, some database systems require manual assessment and updating of each record. Moreover, some database systems are not configured to update multiple records without employing an inordinately complicated process. For example, if an employee leaves a company, a manager or other user may have to spend an unreasonable amount of time to locate all of the records associated with the employee and manually update each record to reflect that the employee is no longer associated with the company.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided to generate an integrated data structure. In an embodiment, a database system is configured to generate an integrated database view that includes data associated with a number of predicate-based groups and a number of enumerated groups. As such, predicate-based membership criteria can be used in part to manage information associated with the database system. Accordingly, declarative membership criteria can be used to provide automatic membership to a group of objects associated with the database system. In one embodiment, a number of predicate-based group membership rules can be used when generating a database view that includes a number of predicate-based groups and a number of enumerated groups.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

Embodiments are provided to generate an integrated data structure. In an embodiment, a database system is configured to generate an integrated database view that includes a predicate-based view and a number of enumerated objects. In another embodiment, a method uses a number of predicate-based group membership rules used when generating a database view that integrates a number of predicate-based views with a number of enumerated groups. The various embodiments can be used with any application that uses groups of objects that are stored in a relational database.

In one embodiment, a database management system includes a database application that can be used to define a number of predicate-based membership and other rules, according to a desired implementation. The database application can be configured to define a number of SELECT statements, union operations, and includes other functionality. The database management system can use a logical schema when defining a predicate-based group membership. A logical schema can also be used to generate a predicate-based membership view, and a number of these views can be combined to provide an integrated predicate-based view. The integrated predicate-based view can be combined with a number of enumerated objects to provide an overall view that encompasses predicate-based and enumerated objects. The overall view can be queried to locate desired information according to a query construct. These and other embodiments are described below, and other embodiments are available.

Figure 1:
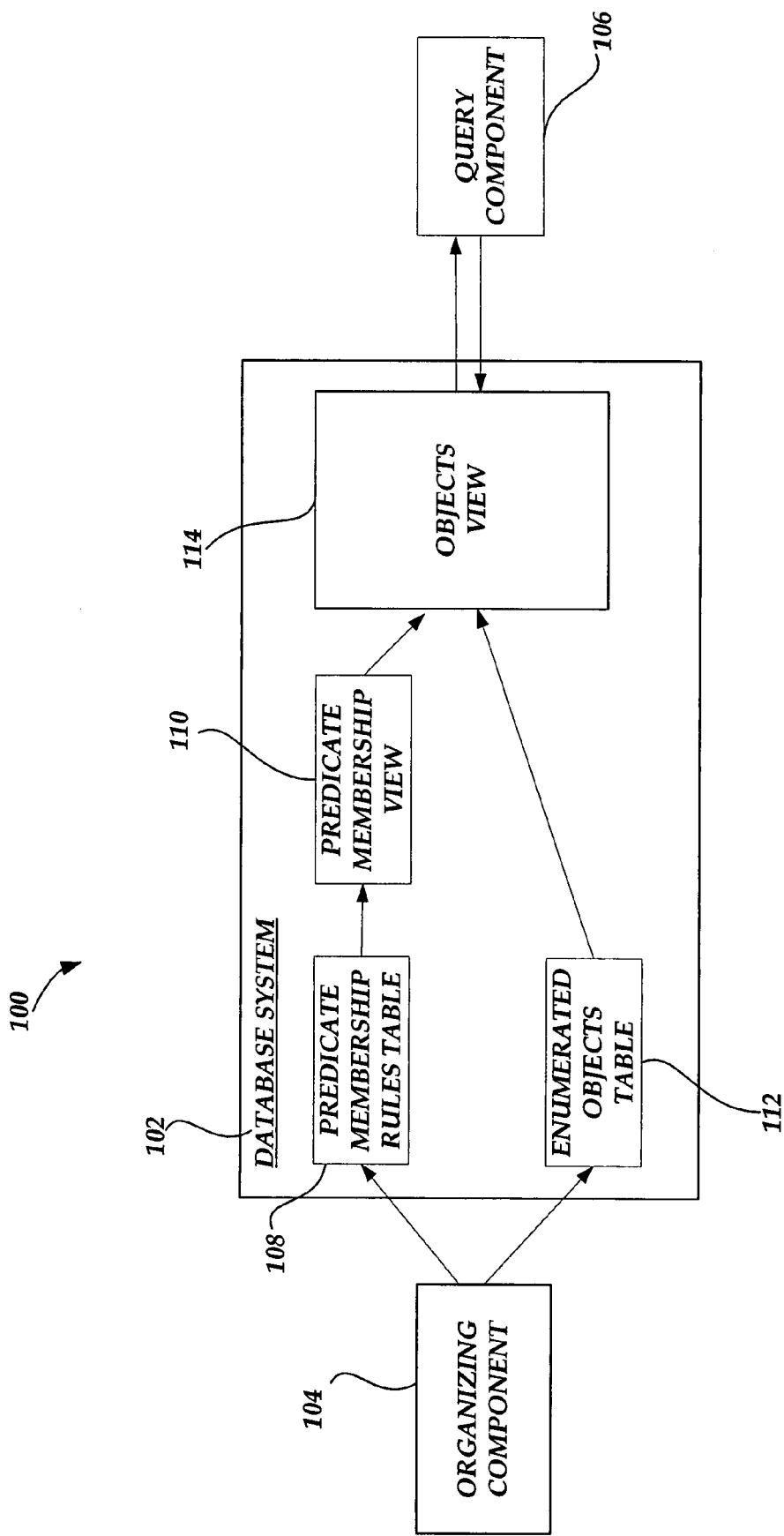
FIG. 1 depicts a block diagram of a system configured to manage information.

FIG. 1 is a block diagram of a system 100 configured to manage information, according to an embodiment. As described below, components of the system 100 can be configured to manage information associated with the database system 102 by using in part a number of predicate-based rules, but are not so limited. In an embodiment, the system 100 can be used to generate a predicate-based group membership data structure, such as a database view for example. In one embodiment, the components of the system 100 can be configured to provide one or more views associated with identity and/or access information. For example, the system 100 can comprise an identity integration system for managing identity, access, and other information associated with an entity.

As shown in FIG. 1, the system 100 includes a database system 102, an organizing component 104, and a query component 106, but is not so limited. The database system 102 can be configured as a relational, multi-dimensional, or other data repository that includes data management functionality. For example, the database system 102 can comprise one or more serving computers and associated storage capacity, such as one or more SQL servers. The database system 102 can include information such as objects, associated attributes, and values for example.

The organizing component 104 can be used to interact with the database system 102 in various ways. In one embodiment, the organizing component 104 can be configured as an application programming interface (API) or other interactive interface and used to interact with the database system 102 to add, delete, and/or modify one or more groups, including parameters associated with the one or more groups. For example, a user can use the organizing component 104 to define attributes for various groups, including predicate-based groups, enumerated groups, and other defined groups. The organizing component 104 can also be used to define one or more rules that can be associated with one or more groups, as described below.

The query component 106 can also be used to interact with the database system 102. For example, the query component 106 can be used to query the database system 102 to determine desired information. In one embodiment, the query component 106 can be used to query the database system 102 and receive results associated with a desired view or subset of data as stored in the database system 102. A view can be used to represent information associated with the database system 102. A view may be automatically generated by storing the associated view criteria as part of a query which can be defined and executed using the query component 106.

With continuing reference to FIG. 1, the database system 102 includes a predicate membership rules table 108. The predicate membership rules table 108 can be used to generate a predicate membership view 110. The predicate membership view 110 can be described as integrated view which includes a number of defined predicate-based views. In an embodiment, the predicate membership view 110 can be created by using a union operation which operates to combine each defined predicate-based view into an integrated view. In one embodiment, a logical schema for the predicate membership rules table 108 includes the following columns, shown in Table 1 below. The predicate membership rules table 108 can include one row for each defined group.

TABLE 1

| Item | Description |
| --- | --- |
| ObjectID | The object identifier of a group associated with a rule |
| PredicateSql | The SQL predicate that define the group membership for the group |
| CteSql | The predicate can use zero or more common table expressions (CTE) |
| ViewName | The name of the view for a rule |
| ViewSql | The SQL for the view definition for the group |
| AddTime | The time when the rule was added |
| AddCause | The ObjectID of the reason for adding the associated rule |
| DeleteTime | The time when the associated rule was deleted |
| DeleteCause | The ObjectID of the reason for deleting the associated rule |

As shown in Table 1, the ObjectID identifies which group an associated membership rule applies to. As described above, the organizing component 104 can be used to define membership rules for various groups. For example, building 42 printers can be defined as all printers whose building attribute is 42. Similarly, and as further example, declarative membership criteria can be used to define a person's staff as all persons whose manager attribute is defined as a particular person. The PredicateSql and ViewSql define which subset of the objects are members of a group. A group can also be a member of a different group.

In one embodiment, the database system 102 maintains an add time and a delete time, which are useful for auditing and other purposes. A rule that is still current can be constructed with a large DeleteTime, such as 9999 for example. When a user uses the organizing component 104 to delete a rule, the operation marks the associated rule as deleted. Add and delete reasons can also be maintained in the database system 102, which can be the ObjectID of the person, rule, process, etc. associated with the addition or deletion of a rule for example.

In one embodiment, the organizing component 104 can be used to define a new rule by specifying an ObjectID, PredicateSql, and CteSql for the new rule. In an alternative embodiment, an AddCause may be specified for the associated rule. The ViewName and ViewSql can be generated by using PredicateMembershipBuildRuleBaseSelect described further below. The ViewName and ViewSql can be generated using the ObjectID, PredicateSql and CteSql parameter and stored with the rule as an optimization.

Correspondingly, once the individual rule's ViewSql is generated, the associated information can be saved and does not require regeneration each time the larger PredicateMembership is regenerated. The AddTime associated with the rule can be generated using a database function that obtains the current time, such as GETUTCDATE for example. As described above, the DeleteTime associated with the rule can be generated as a large number, such as "9999" for example. To delete a rule, the ObjectID and DeleteCause can be specified. The DeleteTime can be generated using a database function that obtains the current time, such as GETUTCDATE for example.

When the predicate membership rules table 108 is updated, the predicate membership view 110 can be regenerated. The regeneration of the predicate membership view 110 can be triggered by a number of stored procedures that are used to modify the predicate membership rules table 108. In another embodiment, the regeneration of the predicate membership view 110 can be triggered by a database trigger on the predicate membership rules table 108. Furthermore, the members of each predicate-based group appear to be enumerated, even though the predicate membership view 110 corresponds to a predicate calculus statement. Although the predicate membership view 110 contains virtual rows that are attached to base tables through a predicate calculus statement (i.e., a view's SELECT statement described below), a user of a view is unaware that the view is not a base table.

In an embodiment, a logical schema for the predicate membership view 110 includes the following columns, as shown in Table 2 below. The predicate membership view 110 can include a row per group-member pair. According to one embodiment, the attribute name associated with the predicate membership view 110 is "member" and has the type "reference."

TABLE 2

| Item | Description |
| --- | --- |
| ObjectID | The identifier of a group object |
| MemberID | The ObjectID for a member object |
| AddTime | The time when a rule was added |
| AddCause | The ObjectID of the reason for adding the associated rule |
| DeleteTime | The time when the associated rule was deleted |
| DeleteCause | The ObjectID of the reason for deleting the associated rule |

When the query component 106 is used to perform a query, a database compiler of the database system 102 can operate to push the associated query predicates down onto predicates on the base tables. For example, a SQL view is a virtual table that adds predicate logic on top of a table. At query compile time, the query on the SQL view can be combined with the associated predicate logic to construct a query on a number of base tables. Correspondingly, a single predicate group rule may add a large number of virtual rows to the predicate membership view 110. For example, a single rule in the predicate membership rules table 108 associated with a group called "All Managers," may add 100,000 virtual rows to the predicate membership view 110.

Accordingly, a large database computation may be required to list all members of the group. On the other hand, testing an individual for membership in the group may only require a simple database index seek on the underlying enumerated objects table 112. As such, the enumerated objects table 112 can be used to define a number of enumerated groups. The number of enumerated groups can include a number of enumerated objects as defined using the organizing component 104.

In an embodiment, a logical schema for the enumerated objects table 112 includes the following columns, as shown in Table 3 below. The logical schema can include a row per attribute value. However, if an attribute is multi-valued, the logical schema may have multiple rows for the same object (e.g., one row per value). In one embodiment, only one of the Value columns is not "NULL." Separate columns can be are provided so that a query can be used to perform comparisons based on specific database types. In another embodiment, a SQL schema can be used for the enumerated objects table 112. Other schemas can be implemented for use with the various embodiments described herein.

TABLE 3

| Item | Description |
|---|---|
| ObjectID | The identifier of an object |
| AttributeName | The name of an attribute associated with the object |
| ValueString | A value if the attribute is a string |
| ValueReference | The value if the attribute is an ObjectID referencing another object |
| AddTime | The time when a rule was added |
| AddCause | The ObjectID of the reason for adding the associated rule |
| DeleteTime | The time when the associated rule was deleted |
| DeleteCause | The ObjectID of the reason for deleting the associated rule |

Content associated with the predicate membership view 110 and the enumerated objects table 112 can be combined to provide an objects view 114. That is, the objects view 114 integrates the predicate-based group membership with enumerated objects by combining the predicate membership view 110 and the enumerated objects. In one embodiment, the objects view 114 is provided as a result of a union operation using data associated with the predicate membership view 110 and data associated with the enumerated objects table 112, as described further below. Correspondingly, users of the objects view 114 do not need to be aware of whether a group exists as a predicate or an explicit enumeration.

The organizing component 104 can be used to create one or more enumerated groups by explicitly enumerating a number of members of each enumerated group. The enumerated group memberships can be stored in the enumerated objects table 112 of the database system 102. The organizing component 104 can also be used to define and store other enumerated objects in the database system 102. For example, other defined enumerated objects may include an employee, a location, a building, computer, printer, process, device, etc. In one embodiment, each enumerated group includes a multi-valued attribute named "member" that contains the ObjectIDs of member objects.

The organizing component 104 can also be used to define a number of predicate-based groups according to a number of desired rules. A predicate-based group refers to a group of objects that is defined and exists as a predicate. Thus, a predicate-based group is configured to be current and up-to-date. As described below, and in accordance with an embodiment, predicate-based groups can be configured to include a number of member inclusions and/or member exclusions having multi-valued attributes which contain ObjectIDs of other objects. The member inclusion attribute values add to the members included by the membership predicate. The member exclusion attribute values remove members included by either the membership predicate or the member inclusion attribute values.

In an embodiment, a number of attributes associated with a predicate-based group can be stored in the enumerated objects table 112. As described below, the Member attribute of a Group object can be either enumerated in the enumerated objects table or defined using group membership rules that are predicates on the objects view. As described above, group membership rules can be defined using the organizing component 104 and stored in the predicate membership rules table 108. Predicates that are used in defining groups can be maintained in a database view (i.e. the predicate membership view 110 of FIG. 1).

The organizing component 104 can be used to define a new rule according to a desired implementation. In an embodiment, after defining a new predicate-based membership rule, a stored procedure can be called to add the new predicate-based membership rule. For example, the PredicateMembershipAddRule stored procedure can be called to add a new predicate-based membership rule. As an example of this, a membership for a group with ID=8A112A70-14D0-40A9-803B-87D1AA764D0C is defined as persons whose manager has object ID=5D6F3249-B729-4DE9-9D64-E14378C21995 as follows:

```
EXEC PredicateMembershipAddRule
    @GroupID = '8A112A70-14D0-40A9-803B-87D1AA764D0C'
    ,@PredicateSql = 'WHERE member.ValueReference =
"5D6F3249-B729-4DE9-9D64-E14378C21995" AND
member.AttributeName = "manager"'
```

According to one embodiment, logic associated with the PredicateMembershipAddRule stored procedure is described below using TransactSQL language. However, similar algorithms can be implemented in various database languages and systems. For example, a markup language, such as extensible markup language (XML) can be used. As shown below, the logic does not include AddCause and DeleteCause in order to simplify the description.

```
CREATE PROCEDURE PredicateMembershipAddRule
    @GroupID              uniqueidentifier,
    @PredicateSql nvarchar(max),
    @CteSql               nvarchar(max) = NULL
AS
BEGIN TRAN
BEGIN TRY
    DECLARE @AddTime datetime
    SET @AddTime = GETUTCDATE( )
    DECLARE @DeleteTime datetime
    SET @DeleteTime = '9999'
    DECLARE @BaseSelectSql nvarchar(max)
    EXEC @BaseSelectSql = dbo.PredicateMembershipBuildRuleBaseSelect
        @GroupID       = @GroupID,
        @PredicateSql  = @PredicateSql,
        @RuleAddTime          = @AddTime,
        @RuleDeleteTime   = @DeleteTime
```

-continued

```
DECLARE @ViewSql nvarchar(max)
EXEC @ViewSql = dbo.PredicateMembershipBuildRuleView
      @GroupID       = @GroupID,
      @CteSql        = @CteSql,
      @BaseSelectSql = @BaseSelectSql,
      @RuleAddTime   = @AddTime,
      @RuleDeleteTime = @DeleteTime
DECLARE @ViewName nvarchar(128)
SET @ViewName = dbo.PredicateMembershipRuleViewName
(@GroupID)
     IF EXISTS (SELECT * FROM sys.views WHERE
object_id = OBJECT_ID(@ViewName))
         EXECUTE('ALTER VIEW dbo.' + @ViewName + ' AS ' +
@ViewSql)
     ELSE
         EXECUTE('CREATE VIEW dbo.' + @ViewName +
' AS ' + @ViewSql)
     INSERT PredicateMembershipRules
   (GroupID, PredicateSql, CteSql, ViewName, ViewSql, AddTime,
DeleteTime)
     VALUES
   (@GroupID, @PredicateSql, @CteSql, @ViewName, @ViewSql,
@AddTime, @DeleteTime)
       IF @@ROWCOUNT > 0
         EXECUTE PredicateMembershipRegenerateView
END TRY
BEGIN CATCH
    ROLLBACK TRAN
    RETURN 1 - return different values depending on the error
END CATCH
COMMIT TRAN
RETURN 0
```

The PredicateMembershipAddRule can be included as a single transaction. Accordingly, the update to predicate membership rules table 108 and the update to the predicate membership view 110 can be both performed or both not performed. In one embodiment, the PredicateMembershipAddRule generates an AddTime using a database function that obtains the current time, such as GETUTCDATE( ) for example. The DeleteTime can be generated as a large number, such as 9999 for example. The PredicateMembershipBuildRuleBaseSelect can be called to build the SELECT statement that obtains the predicate-based members. The memberInclusions and memberExclusions attributes are described below. The PredicateMembershipBuildRuleView function can be called to build the SELECT for this single rule that handles the interaction between predicate members and the memberExclusions attributes. A new row can then be inserted into the predicate membership rules table 108.

The PredicateMembershipRegenerateView stored procedure can then be called, which operations to union all of the rule views. The PredicateMembershipRegenerateView stored procedure also handles the interaction between the memberInclusions and memberExclusions attributes for all predicate-based groups. The view can be created if it did not already exist, or altered if it already exists. The view is named with a desired convention which can include the ObjectID of the group provided by the PredicateMembershipRuleViewName function.

Figure 2:
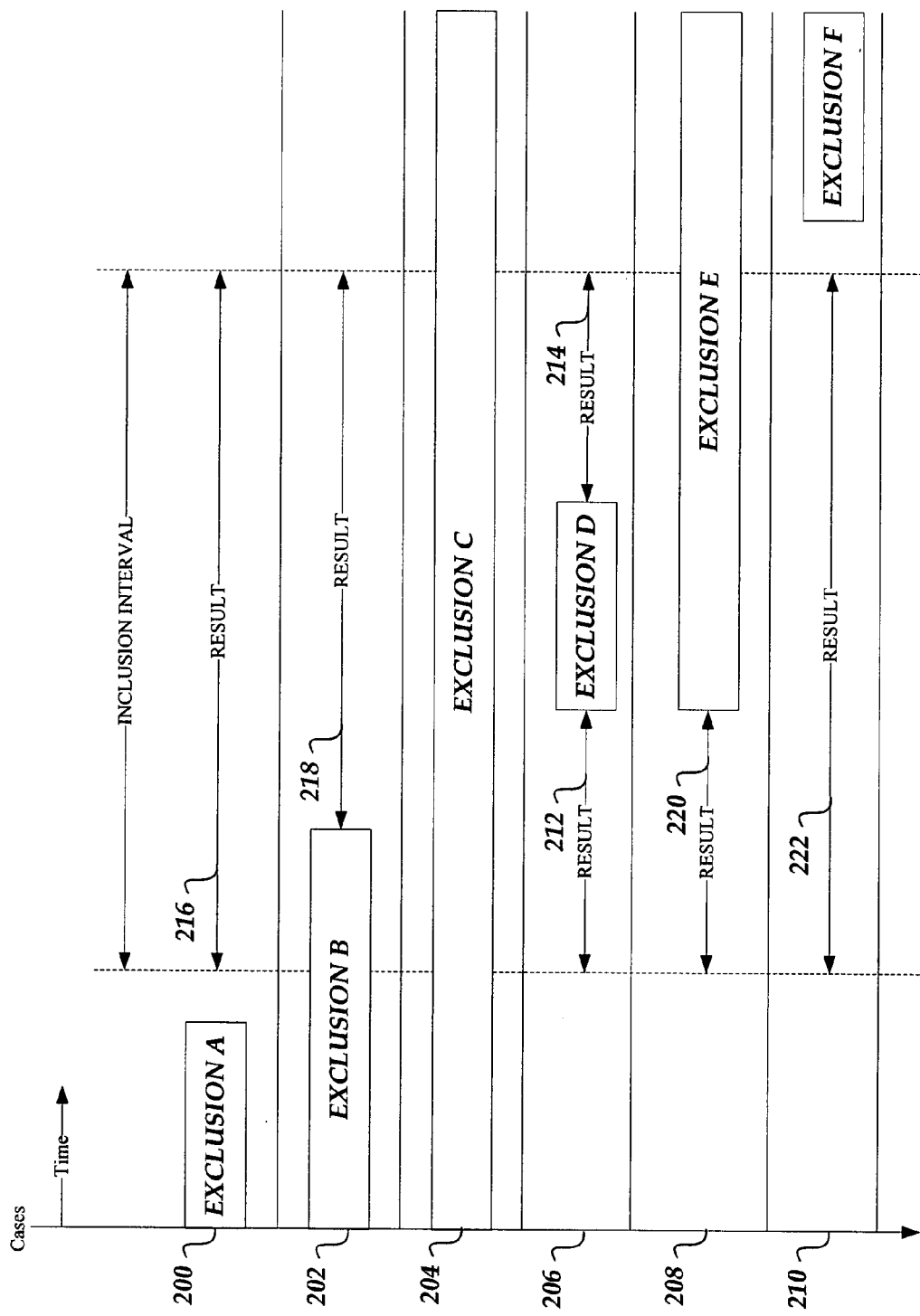
FIG. 2 is a diagram illustrating aspects of inclusion and exclusion operations.

FIG. 2 is a diagram illustrating aspects of inclusion and exclusion operations, under an embodiment. As shown in FIG. 2, there are six different cases, designated as 200-210. According to this embodiment, exclusion negates inclusion when they overlap in time. These cases can be handled by 3 SELECT statements that are unioned together. The SELECT numbers correspond to the order of the SELECTs included in the PredicateMembershipBuildRuleView function. Note that case 204 has no result intervals because there is complete overlap of the exclusion across the inclusion interval. Case 206 has two result intervals 212 and 214 since the exclusion divides the inclusion interval into two parts. As described below, interval 212 can be produced by SELECT 2 and interval 214 can be produced by SELECT 3. Cases 200, 202, 208, and 210 have one result interval (i.e., intervals 216, 218, 220, and 222 respectively).

SELECT 1 corresponds to producing a row for the full inclusion interval when an inclusion does not have an entry in the memberExclusions attribute.

SELECT 2 corresponds to producing a row with the following aspects when an inclusion has an entry in the memberExclusions attribute and the inclusion range starts before the exclusion range ends (e.g., cases 206, 208, and 210). SELECT 2 results in a row having:
 a) result.AddTime=inclusion.AddTime
 b) result.DeleteTime=minimum(inclusion.DeleteTime, exclusion.AddTime)
 c) result.AddCause=inclusion.AddCause
 d) result.DeleteCause=the cause corresponding to the time that won the battle for result.DeleteTime
Thus for SELECT 2, result.DeleteTime=exclusion.AddTime for cases 206 and 208, and result.DeleteTime=inclusion.DeleteTime for case 210 (i.e., no overlap).

SELECT 3 corresponds to producing a new row with the following aspects when an inclusion has an entry in the memberExclusions attribute and the inclusion range ends before the exclusion range ends (e.g., cases 200, 202, and 206). SELECT 3 results in a row having:
 a) result.AddTime=maximum(inclusion.AddTime, exclusion.DeleteTime).
 b) result.DeleteTime=inclusion.DeleteTime
 c) result.AddCause=the cause corresponding to the time that won the battle for result.AddTime
 d) result.DeleteCause=inclusion.DeleteCause
Thus for SELECT 3, result.DeleteTime=inclusion.DeleteTime (no overlap) for case 200, and result.DeleteTime=exclusion.AddTime for cases 202 and 206.

As described below, the inclusion-exclusion interaction rules can be used in various functions and operations. For example, the PredicateMembershipBuildRuleBaseSelect function can use the inclusion-exclusion interaction rules for the interaction between the predicate-based inclusions and the memberExclusions attribute for each predicate-membership rule. As further example, the PredicateMembershipBuildRuleView function can use the inclusion-exclusion interaction rules for the interaction between the memberInclusions and memberExclusions attributes for all predicate-based groups.

According to one embodiment, logic associated with the PredicateMembershipBuildRuleBaseSelect function is described below using TransactSQL language. Again, similar algorithms can be implemented in various database languages and systems. The logic for the PredicateMembershipBuildRuleBaseSelect function can be defined as:

```
CREATE FUNCTION PredicateMembershipBuildRuleBaseSelect
(
   @GroupID         uniqueidentifier,
   @PredicateSql    nvarchar(max),
   @RuleAddTime         datetime,
   @RuleDeleteTime   datetime
)
```

```
        RETURNS nvarchar(max)
        AS
        BEGIN
        -- Row AddTime is max of object AddTime and rule AddTime
            DECLARE @AddTimeString nvarchar(max)
            DECLARE @RuleAddTimeString nvarchar(max)
            SET @RuleAddTimeString = 'CAST(''' + CAST
        (@RuleAddTime AS nvarchar(max)) + ''' AS datetime)'
            SET @AddTimeString =
        'CASE WHEN member.AddTime >= ' + @RuleAddTimeString +
        ' THEN member.AddTime ELSE ' + @RuleAddTimeString + ' END '
        -- Row DeleteTime is min of object DeleteTime and rule DeleteTime
            DECLARE @DeleteTimeString nvarchar(max)
            DECLARE @RuleDeleteTimeString nvarchar(max)
            SET @RuleDeleteTimeString = '''' + CAST
        (@RuleDeleteTime AS nvarchar(max)) + ''''
            SET @DeleteTimeString =
        'CASE WHEN member.DeleteTime <= ' + @RuleDeleteTimeString +
        ' THEN member.DeleteTime ELSE ' + @RuleDeleteTimeString +
        ' END '
            DECLARE @AddCauseString nvarchar(max)
            SET @AddCauseString = '''' + CAST(@GroupID AS
        nvarchar(max)) + ''''
            DECLARE @DeleteCauseString nvarchar(max)
            IF @RuleDeleteTime = '9999'
                    SET @DeleteCauseString = 'NULL'
            ELSE
                    SET @DeleteCauseString = '''' + CAST(@GroupID
        AS nvarchar(max)) + ''''
            DECLARE @BaseSelectSql nvarchar(max)
            SET @BaseSelectSql = @BaseSelectSql +
        'SELECT DISTINCT' +
        'CAST(''' + CAST(@GroupID AS nvarchar(max)) + ''' AS
        uniqueidentifier) ObjectID,' +
        'member.ObjectID MemberID, ' +
        @AddTimeString + ' AddTime, ' +
        'CAST(' + @AddCauseString + ' AS uniqueidentifier) AddCause, ' +
        @DeleteTimeString + ' DeleteTime, ' +
        'CAST(' + @DeleteCauseString + ' AS uniqueidentifier)
        DeleteCause ' +
        'FROM EnumeratedObjects member' +
        @PredicateSql
                    RETURN @BaseSelectSql
        END
```

The PredicateMembershipBuildRuleBaseSelect function operates to build a base SELECT statement for the associated rule, and defines a number of virtual rows that correspond with the format of the predicate membership view 110. The AddTime for the number of virtual rows can be defined as the maximum of the following:

a) the AddTime for the rows of the enumerated objects table 112 that qualify the members to be in a group, and b) the AddTime for the associated rule.

In other words, the membership begins after both of the qualifying value and the associated rule are added.

The DeleteTime for the number of virtual rows can be defined as the minimum of the following:

a) the DeleteTime for rows of the enumerated objects table 112 that qualify the members to be in the group, and b) the DeleteTime for the associated rule.

In other words, the membership ends when either the qualifying value or the rule has been deleted. The AddCause and DeleteCause are the predicate-based membership rule ID which corresponds to the GroupID.

According to one embodiment, logic associated with the PredicateMembershipBuildRuleView function is described below using TransactSQL language. Again, similar algorithms can be implemented in various database languages and systems. The logic for the PredicateMembershipBuildRuleView function can be defined as:

```
        CREATE FUNCTION PredicateMembershipBuildRuleView
        (
            @GroupID            uniqueidentifier,
            @CteSql             nvarchar(max),
            @BaseSelectSql      nvarchar(max),
            @RuleAddTime        datetime,
            @RuleDeleteTime     datetime
        )
        RETURNS nvarchar(max)
        AS
        BEGIN
            DECLARE @ViewSql nvarchar(max)
            DECLARE @GroupIDString nvarchar(128)
            SET @GroupIDString = CAST(@GroupID AS nvarchar(128))
            -- Compose rule CTE with view CTE correctly.
            IF (@CteSql IS NOT NULL) AND (@CteSql != '')
                    SET @ViewSql = '
        WITH ' + @CteSql + ',
        '
            ELSE
                    SET @ViewSql = '
        WITH '
            SET @ViewSql = @ViewSql +
            'BaseInclusionView(ObjectID, MemberID, AddTime, AddCause,
        DeleteTime, DeleteCause) AS
        (' + @BaseSelectSql + ')
```

The following logic is configured to handle interaction between a group's predicate inclusion rule and the group's memberExclusions attribute. The logic also handles predicate inclusion members with no entry in the memberExclusions attribute.

```
        SELECT *
        FROM BaseInclusionView inclusion
        WHERE inclusion.MemberID NOT IN
        (
            SELECT exclusion.ValueReference FROM EnumeratedObjects
            exclusion
            WHERE    exclusion.AttributeName    =    "memberExclusions"
        AND exclusion.ObjectID = ''' + @GroupIDString + '''
        )
        UNION ALL
```

For predicate inclusion members with an entry in the memberExclusions attribute and the inclusion range comes before the exclusion range, the logic is as follows:

```
        SELECT
            inclusion.ObjectID          ObjectID,
            inclusion.MemberID          MemberID,
            inclusion.AddTime           AddTime,
            inclusion.AddCause          AddCause,
            CASE WHEN inclusion.DeleteTime <=
        exclusion.AddTime THEN inclusion.DeleteTime
        ELSE exclusion.AddTime END DeleteTime,
            CASE WHEN inclusion.DeleteTime <=
        exclusion.AddTime THEN inclusion.DeleteCause
        ELSE exclusion.AddCause END DeleteCause
            FROM BaseInclusionView inclusion
            JOIN EnumeratedObjects exclusion ON
                inclusion.ObjectID = exclusion.ObjectID
            AND exclusion.AttributeName = "memberExclusions"
            AND inclusion.MemberID = exclusion.ValueReference
            WHERE
                inclusion.ObjectID = ''' + @GroupIDString + '''
            AND inclusion.AddTime < exclusion.DeleteTime
            UNION ALL
```

For predicate inclusion members with an entry in the memberExclusions attribute and the inclusion range comes after the exclusion range, the logic is as follows:

```
SELECT
    inclusion.ObjectID          ObjectID,
    inclusion.MemberID          MemberID,
    CASE WHEN inclusion.AddTime >=
exclusion.DeleteTime  THEN inclusion.AddTime ELSE
exclusion.DeleteTime END AddTime,
    CASE WHEN inclusion.AddTime >=
exclusion.DeleteTime  THEN inclusion.AddCause ELSE
exclusion.DeleteCause END AddCause,
    inclusion.DeleteTime        DeleteTime,
    inclusion.DeleteCause       DeleteCause
FROM BaseInclusionView inclusion
JOIN EnumeratedObjects exclusion ON
    inclusion.ObjectID = exclusion.ObjectID
    AND exclusion.AttributeName = "memberExclusions"
    AND inclusion.MemberID = exclusion.ValueReference
WHERE
    inclusion.ObjectID = ''' + @GroupIDString + '''
    AND exclusion.DeleteTime < inclusion.DeleteTime'
    RETURN @ViewSql
END
```

As shown above, the PredicateMembershipBuildRuleView function generates the rule-specific view by doing the following:

a) composes a number of CTEs according to SQL syntax b) applies the rules for interaction between inclusions and exclusions that were described above to this predicate-based membership rule and the memberExclusions attributes, and c) operates to union the three SELECTs in the inclusion-exclusion interaction rules described above.

According to one embodiment, logic associated with the PredicateMembershipRegenerateView stored procedure is described below using TransactSQL language. Again, similar algorithms can be implemented in various database languages and systems. The logic for the PredicateMembershipRegenerateView stored procedure can be defined as follows:

```
CREATE PROCEDURE PredicateMembershipRegenerateView
AS
BEGIN
    DECLARE @EString nvarchar(max)
    (Cursor includes all rules, current and deleted.)
    DECLARE     RuleCursor   CURSOR    LOCAL
READ_ONLY FAST_FORWARD FOR
        SELECT DISTINCT ViewName FROM PredicateMembershipRules
    OPEN RuleCursor
    DECLARE @ViewName       nvarchar(128)
    DECLARE @SelectSql      nvarchar(max)
    DECLARE @SelectString   nvarchar(max)
    DECLARE @StartSelect bit
    SET @StartSelect = 0
    SET @SelectString = ''
    WHILE 1=1
    BEGIN
      SET @ViewName = 'FFFF'
      FETCH NEXT FROM RuleCursor INTO @ViewName
      IF @ViewName = 'FFFF'
        BREAK -- no more records
      SET @SelectSql = 'SELECT * FROM ' + @ViewName
      IF @StartSelect = 0
        SET @StartSelect = 1
      ELSE
        SET @SelectString = @SelectString + ' UNION ALL '
      SET @SelectString = @SelectString + @SelectSql
    END
    CLOSE RuleCursor
```

-continued

```
    IF EXISTS (SELECT * FROM sys.views
      WHERE object_id = OBJECT_ID(N'[dbo].[PredicateMembership]'))
        SET @EString = 'ALTER VIEW [dbo].[PredicateMembership] AS '
      ELSE
        SET @EString = 'CREATE VIEW [dbo].[PredicateMembership] AS '
    IF @SelectString != ''
        SET @EString = @EString + '
```

The following provide the views for predicate membership minus memberExclusions.

```
' + @SelectString +
' UNION ALL '
      ELSE
        SET @EString = @EString + '
-- There are no views for predicate membership'
        SET @EString = @EString + '
```

The following logic is configured to handle memberInclusions minus memberExclusions for all predicate-based membership groups.

For inclusionMembers with no entry in the memberExclusions attribute, the logic is as follows:

```
SELECT
    inclusion.ObjectID          ObjectID,
    inclusion.ValueReference    MemberID,
    CASE
    WHEN inclusion.AddTime >= r.AddTime THEN inclusion.AddTime
    ELSE r.AddTime
    END                         AddTime,
    inclusion.AddCause          AddCause,
    CASE
    WHEN inclusion.DeleteTime <= r.DeleteTime THEN
inclusion.DeleteTime
    ELSE r.DeleteTime
    END                         DeleteTime,
    inclusion.DeleteCause       DeleteCause
FROM EnumeratedObjects inclusion
JOIN PredicateMembershipRules r ON inclusion.ObjectID = r.GroupID
WHERE inclusion.AttributeName = "memberInclusions"
    AND inclusion.ValueReference NOT IN
    (
        SELECT exclusion.ValueReference FROM EnumeratedObjects exclusion
        WHERE exclusion.ObjectID = inclusion.ObjectID AND
exclusion.AttributeName
        = "memberExclusions"
    )
    UNION ALL
```

For inclusionMembers with an entry in the memberExclusions attribute and the inclusion range comes before the exclusion range, the logic is as follows:

```
SELECT
    inclusion.ObjectID          ObjectID,
    inclusion.ValueReference    MemberID,
    inclusion.AddTime           AddTime,
    inclusion.AddCause          AddCause,
    CASE
    WHEN inclusion.DeleteTime <= exclusion.AddTime THEN
inclusion.DeleteTime
```

```
    ELSE exclusion.AddTime
    END                     DeleteTime,
      CASE
    WHEN  inclusion.DeleteTime <= exclusion.AddTime  THEN
inclusion.DeleteCause
    ELSE exclusion.AddCause
    END                     DeleteCause
    FROM EnumeratedObjects inclusion
    JOIN EnumeratedObjects exclusion ON
        inclusion.ObjectID = exclusion.ObjectID
    AND exclusion.AttributeName = "memberExclusions"
    AND inclusion.ValueReference = exclusion.ValueReference
    WHERE
        inclusion.ObjectID IN (SELECT r.GroupID FROM
PredicateMembershipRules r)
    AND inclusion.AttributeName = "memberInclusions"
    AND inclusion.AddTime < exclusion.DeleteTime
    UNION ALL
```

For inclusionMembers with an entry in the memberExclusions attribute and the inclusion range comes after the exclusion range, the logic is as follows:

```
SELECT
    inclusion.ObjectID      ObjectID,
    inclusion.ValueReference  MemberID,
    CASE
    WHEN inclusion.AddTime >= exclusion.DeleteTime THEN
inclusion.AddTime
    ELSE exclusion.DeleteTime
    END                     AddTime,
      CASE
    WHEN inclusion.AddTime >= exclusion.DeleteTime THEN
inclusion.AddCause
    ELSE exclusion.DeleteCause
    END                     AddCause,
    inclusion.DeleteTime    DeleteTime,
    inclusion.DeleteCause   DeleteCause
    FROM EnumeratedObjects inclusion
    JOIN EnumeratedObjects exclusion ON
    inclusion.ObjectID = exclusion.ObjectID
    AND exclusion.AttributeName = "memberExclusions"
    AND inclusion.ValueReference = exclusion.ValueReference
    WHERE
        inclusion.ObjectID IN (SELECT r.GroupID FROM
PredicateMembershipRules r)
    AND inclusion.AttributeName = "memberInclusions"
    AND exclusion.DeleteTime < inclusion.DeleteTime'
    EXECUTE(@EString)
    END
```

The PredicateMembershipRegenerateView stored procedure regenerates the predicate membership view 110 by performing the following:

a) performing a union operation of the per predicate-based membership rule views by creating a cursor across all rules in the predicate membership rules table 108 b) applying the rules for interaction between inclusions and exclusions described above to the memberInclusions and memberExclusions attributes. This operates to union the three SELECTs in the interaction rules to the view. The three SELECTs handle the memberInclusions and memberExclusions attributes for all predicate-based membership groups, because they are independent of the membership predicate. Since the above can be handled outside of individual rules, they can be performed once for all rules, resulting in a more efficient process since the number of SELECT statements can be reduced. In one embodiment, the memberInclusions and memberExclusions attributes are included in the top-level predicate membership view 110 instead of in each rule-specific view.

c) if not in existence, the predicate membership view 110 can be created, or the view can be altered if already in existence.

According to one embodiment, logic associated with the PredicateMembershipDeleteRule stored procedure is described below using TransactSQL language. Again, similar algorithms can be implemented in various database languages and systems. The logic for the PredicateMembershipDeleteRule stored procedure can be defined as (the DeleteCause parameter is omitted to simplify the description):

```
CREATE PROCEDURE PredicateMembershipDeleteRule
    @GroupID uniqueidentifier
AS
BEGIN TRAN
BEGIN TRY
    DECLARE @DeleteTime datetime
    SET @DeleteTime = GETUTCDATE( )
    (Mark as deleted.)
    UPDATE PredicateMembershipRules
    SET DeleteTime = @DeleteTime
    WHERE GroupID = @GroupID AND DeleteTime = '9999'
    IF @@ROWCOUNT > 0
        EXECUTE PredicateMembershipRegenerateView
    (Delete the view.)
    DECLARE @ViewName nvarchar(128)
    SET @ViewName = dbo.PredicateMembershipRuleViewName
(@GroupID)
    IF  EXISTS (SELECT  *  FROM  sys.views  WHERE
object_id = OBJECT_ID(@ViewName))
        EXECUTE('DROP VIEW ' + @ViewName)
    END TRY
    BEGIN CATCH
        ROLLBACK TRAN
        RETURN 1
    END CATCH
    COMMIT TRAN
    RETURN 0
```

The PredicateMembershipDeleteRule can be performed in a single transaction, so that the update to predicate membership rules table 108 and the deletion of the rule-specific view are either both done or both not done. The PredicateMembershipDeleteRule operates to do the following:

a) generates the DeleteTime using a database function that gets the current time, such as GETUTCDATE( ) for example b) marks the PredicateMembershipRules row as deleted by setting the DeleteTime c) deletes the rule-specific view. In one embodiment, the view name uses the same PredicateMembershipRuleViewName function to convert the GroupID to the view name, and d) calls the PredicateMembershipRegenerateView stored procedure to regenerate the predicate membership view 110 with the exclusion of the deleted group's rule.

According an embodiment, the following logic operates to integrate predicate-based group membership parameters, which includes using the above predicate membership view 110 and the enumerated objects table 112 to generate an objects view 114. The logic to create the objects view 114 includes:

```
CREATE VIEW Objects AS
    SELECT
    ObjectID,
```

```
CAST('member' AS nvarchar(128)) AttributeName,
CAST(NULL AS nvarchar(450)) ValueString,
...
MemberID ValueReference,
AddTime,
AddCause,
DeleteTime,
DeleteCause
FROM PredicateMembership
UNION ALL
SELECT * FROM EnumeratedObjects
```

For the first SELECT from PredicateMembership, the AttributeName is "member", the MemberID is put in the ValueReference column, and all other values are NULL. Correspondingly, the above-defined view (see objects view 114 of FIG. 1) allows queries to be built and executed without having to know which groups have enumerated membership and which groups have predicate membership. That is, both types of group membership have enumerated member attribute qualities.

Figure 3:
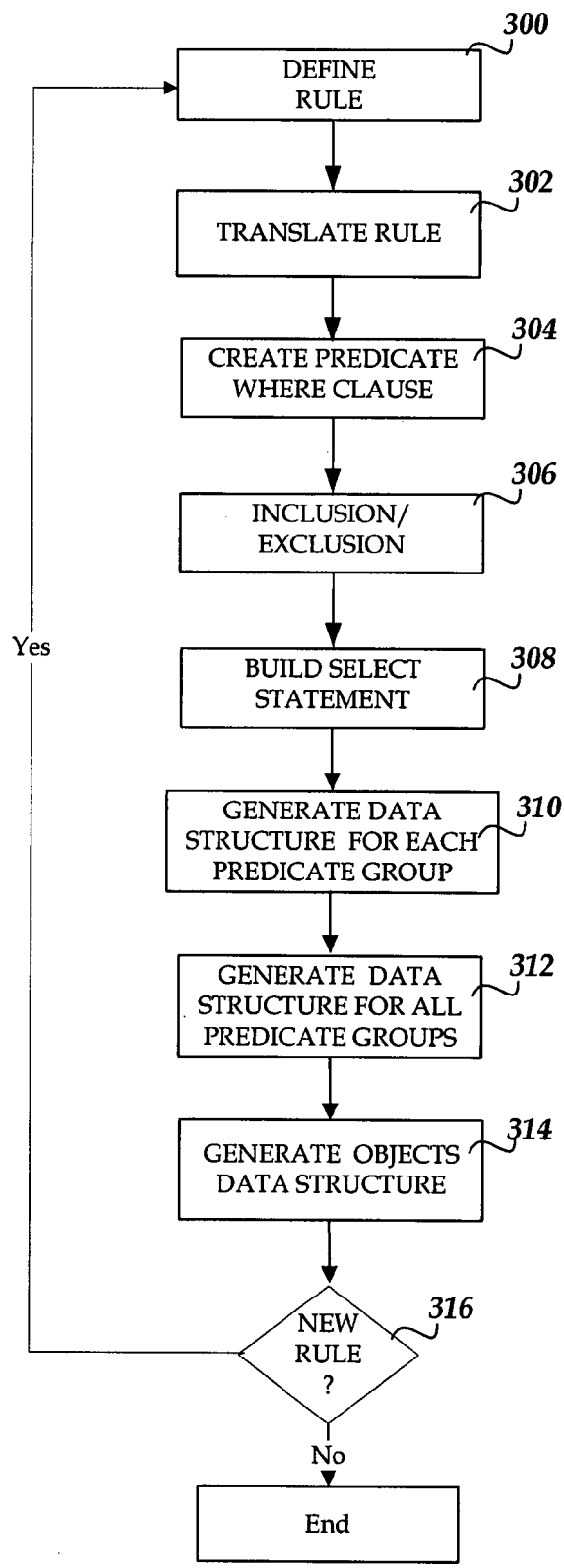
FIG. 3 is a flow diagram illustrating a process of providing an integrated data structure.

FIG. 3 is a flow diagram illustrating a process of providing an integrated data structure, under an embodiment. For example, the process of FIG. 3 can be used to generate an integrated object view that includes a number of predicate-based objects and a number of enumerated objects. The components of FIG. 1 are referred to in the description of FIG. 3, but the embodiment is not so limited. At 300, the organizing component 104 can be used to define a predicate-based rule. For example, the organizing component 104 can be used to define a predicate-based group membership rule associated with an aspect of a business, including defining a group ID and the associated members. At 302, the database system 102 translates the rule if the rule is defined in a non-native language. For example, if a rule is defined in XML, the XML-based rule can be translated by a database compiler into SQL format.

At 304, the database system 102 creates a predicate where-clause that is associated with the rule. At 306, the database system 102 considers any inclusion and/or exclusion operations that may be associated with the rule. At 308, the database system 102 builds a SELECT statement for the associated rule. At 310, the database system 102 generates a data structure for each defined predicate-based group. At 312, the database system 102 generates an encompassing data structure for all of the predicate-based groups. In one embodiment, the database system 102 uses a union operation to union each view of a defined predicate-based group into an overall predicate-based view which encompasses each individual predicate-based view.

At 314, the database system 102 generates an objects data structure which encompasses the data structure associated with all of the predicate-based groups and any enumerated objects. In one embodiment, the database system 102 uses a union operation to union all of the predicate-based groups and any enumerated objects when generating an objects view. If there are new rules to be defined at 316, the flow returns to 300. If there are no new rules to define, the flow ends.

The following provides an example of using of group membership rules to provide an integrated data set to a user.

The organizing component 104 can be used to designate and manage groupings, rules, and other information, as described above. For any object, an ObjectID can be defined using a function that generates a unique ID. Staff associated with manager John Doe can be designated as a group with an identification (ID)=8A112A70-14D0-40A9-803B-87D1AA764D0C and defined as persons whose manager has object ID=5D6F3249-B729-4DE9-9D64-E14378C21995, thereby defining a predicate-based membership rule. John Doe's staff can be defined as follows:

```
EXEC PredicateMembershipAddRule
    @GroupID = '8A112A70-14D0-40A9-803B-87D1AA764D0C'
    ,@PredicateSql = 'WHERE member.ValueReference =
    "5D6F3249-B729-4DE9-9D64-E14378C21995" AND
    member.AttributeName = "manager"'
```

Extended staff associated with John Doe can be designated as a group with ID=C2B502C1-368C-44A6-83D0-EACAE414EFE6 and defined as persons whose manager eventually reports to the manager with object ID=5D6F3249-B729-4DE9-9D64-E14378C21995. This uses a recursive CTE to traverse the management chain:

```
EXEC PredicateMembershipAddRule
    @GroupID = 'C2B502C1-368C-44A6-83D0-EACAE414EFE6'
    ,@PredicateSql = 'JOIN JohnDoeStaffs ON s.ObjectID =
member.ObjectID'
    ,@CteSql =
    'JohnDoeStaff (ObjectID) AS
    (
    SELECT members.ObjectID FROM EnumeratedObjects members
WHERE members.ValueReference = "5D6F3249-B729-4DE9-
9D64-E14378C21995" AND members.AttributeName = "manager"
    UNION ALL
    SELECT members.ObjectID FROM EnumeratedObjects members
    JOIN JohnDoeStaffs ON
    members.ValueReference =s.ObjectID AND members.AttributeName =
"manager"
    )'
```

All Managers can be designated as a group with ID=62132177-50F3-4437-98D0-FD7DE2B5497A and defined as persons referenced by at least one employee:

```
EXEC @R = PredicateMembershipAddRule
    @GroupID = '62132177-50F3-4437-98D0-FD7DE2B5497A'
    ,@PredicateSql = 'WHERE member.ObjectID IN (SELECT
    ValueReference FROM EnumeratedObjects members WHERE
    AttributeName = "manager")'
```

Full time employees can be designated as a group with ID=BE740FF6-8C80-4B75-9A33-5799F9C5F42A and defined as persons whose object type is FullTimeEmployee:

```
EXEC @R = PredicateMembershipAddRule
    @GroupID = 'BE740FF6-8C80-4B75-9A33-5799F9C5F42A'
    ,@PredicateSql = 'WHERE member.AttributeName =
    "objectType" AND member.ValueString = "FullTimeEmployee"'
```

The above-defined group membership rules result in the following generated views. The predicate membership views 110 for each defined group can be defined as follows (minus memberExclusions):

```
SELECT                                                    * FROM
PredicateMembershipRule_62132177_50F3_4437_98D0_
FD7DE2B5497A
```

```
UNION ALL
SELECT                                      *    FROM
PredicateMembershipRule__8A112A70__14D0__40A9__803B__
87D1AA764D0C
    UNION ALL
    SELECT                                  *    FROM
PredicateMembershipRule__BE740FF6__8C80__4B75__9A33__
5799F9C5F42A
    UNION ALL
    SELECT                                  *    FROM
PredicateMembershipRule__C2B502C1__368C__44A6__83D0__
EACAE414EFE6
    UNION ALL
```

The following description handles memberInclusions minus memberExclusions for all defined predicate membership groups.

For inclusionMembers with no entry in the memberExclusions attribute:

```
SELECT
    inclusion.ObjectID      ObjectID,
    inclusion.ValueReference   MemberID,
    CASE
WHEN inclusion.AddTime >= r.AddTime THEN inclusion.AddTime
ELSE r.AddTime
END                         AddTime,
    inclusion.AddCause      AddCause,
    CASE
WHEN inclusion.DeteteTime <= r.DeleteTime THEN
inclusion.DeleteTime
ELSE r.DeleteTime
END                         DeleteTime,
    inclusion.DeleteCause   DeleteCause
FROM EnumeratedObjects inclusion
JOIN PredicateMembershipRules r ON inclusion.ObjectID = r.GroupID
WHERE inclusion.AttributeName = 'memberInclusions'
AND inclusion.ValueReference NOT IN
(
    SELECT exclusion.ValueReference FROM EnumeratedObjects
exclusion
    WHERE exclusion.ObjectID = inclusion.ObjectID
AND exclusion.AttributeName = 'memberExclusions'
)
UNION ALL
```

For inclusionMembers with an entry in the memberExclusions attribute and the inclusion range comes before the exclusion range:

```
SELECT
    inclusion.ObjectID      ObjectID,
    inclusion.ValueReference   MemberID,
    inclusion.AddTime       AddTime,
    inclusion.AddCause      AddCause,
    CASE
    WHEN inclusion.DeleteTime <= exclusion.AddTime THEN
inclusion.DeleteTime
    ELSE exclusion.AddTime
    END                     DeleteTime,
    CASE
    WHEN inclusion.DeleteTime <= exclusion.AddTime THEN
inclusion.DeleteCause
    ELSE exclusion.AddCause
    END                     DeleteCause
FROM EnumeratedObjects inclusion
JOIN EnumeratedObjects exclusion ON
    inclusion.ObjectID = exclusion.ObjectID
AND exclusion.AttributeName = 'memberExclusions'
AND inclusion.ValueReference = exclusion.ValueReference
```

```
WHERE
    inclusion.ObjectID  IN   (SELECT   r.GroupID   FROM
PredicateMembershipRules r)
AND inclusion.AttributeName = 'memberInclusions'
AND inclusion.AddTime < exclusion.DeleteTime
UNION ALL
```

For inclusionMembers with an entry in the memberExclusions attribute and the inclusion range comes after the exclusion range:

```
SELECT
    inclusion.ObjectID      ObjectID,
    inclusion.ValueReference   MemberID,
    CASE
    WHEN inclusion.AddTime >= exclusion.DeleteTime THEN
inclusion.AddTime
    ELSE exclusion.DeleteTime
    END                     AddTime,
    CASE
    WHEN inclusion.AddTime >= exclusion.DeleteTime THEN
inclusion.AddCause
    ELSE exclusion.DeleteCause
    END                     AddCause,
    inclusion.DeleteTime    DeleteTime,
    inclusion.DeleteCause   DeleteCause
FROM EnumeratedObjects inclusion
JOIN EnumeratedObjects exclusion ON
    inclusion.ObjectID = exclusion.ObjectID
AND exclusion.AttributeName = 'memberExclusions'
AND inclusion.ValueReference = exclusion.ValueReference
WHERE
    inclusion.ObjectID  IN   (SELECT   r.GroupID   FROM
PredicateMembershipRules r)
AND inclusion.AttributeName = 'memberInclusions'
AND exclusion.DeleteTime < inclusion.DeleteTime
```

The view for John Doe's staff can be defined as follows:

```
View                                              name:
PredicateMembershipRule__8A112A70__14D0__40A9__803B__
87D1AA764D0C
    WITH   BaseInclusionView(ObjectID, MemberID, AddTime,
AddCause, DeleteTime, DeleteCause) AS
    (
    SELECT DISTINCT
        CAST('8A112A70-14D0-40A9-803B-87D1AA764D0C' AS
uniqueidentifier) ObjectID,
        member.ObjectID     MemberID,
        CASE
    WHEN member.AddTime >= CAST('Oct 31 8:49PM' AS datetime)
    THEN member.AddTime
    ELSE CAST('Oct 31 8:49PM' AS datetime)
    END                     AddTime,
        CAST('8A112A70-14D0-40A9-803B-87D1AA764D0C' AS
uniqueidentifier) AddCause,
    CASE
    WHEN member.DeleteTime <= 'Jan 1 9999 12:00AM' THEN
member.DeleteTime
    ELSE 'Jan 1 9999 12:00AM'
    END                     DeleteTime,
        CAST(NULL AS uniqueidentifier) DeleteCause
    FROM EnumeratedObjects member
    WHERE member.ValueReference = '5D6F3249-B729-4DE9-9D64-
E14378C21995' AND member.AttributeName = 'manager'
    )
```

The following description handles interaction between the group's predicate inclusion rule and the group's memberExclusions attribute.

Predicate inclusion members with no entry in the memberExclusions attribute include:

```
SELECT *
FROM BaseInclusionView inclusion
WHERE inclusion.MemberID NOT IN
(
    SELECT exclusion.ValueReference FROM EnumeratedObjects
    exclusion
    WHERE exclusion.AttributeName = 'memberExclusions'
    AND exclusion.ObjectID = '8A112A70-14D0-40A9-803B-
    87D1AA764D0C'
)
UNION ALL
```

Predicate inclusion members with an entry in the memberExclusions attribute and the inclusion range comes before the exclusion range includes:

```
SELECT
    inclusion.ObjectID    ObjectID,
    inclusion.MemberID    MemberID,
    inclusion.AddTime     AddTime,
    inclusion.AddCause    AddCause,
    CASE
    WHEN   inclusion.DeleteTime   <=   exclusion.AddTime   THEN
inclusion.DeleteTime
    ELSE exclusion.AddTime
    END                   DeleteTime,
    CASE
    WHEN   inclusion.DeleteTime   <=   exclusion.AddTime   THEN
inclusion.DeleteCause
    ELSE exclusion.AddCause
    END                   DeleteCause
FROM BaseInclusionView inclusion
JOIN EnumeratedObjects exclusion ON
    inclusion.ObjectID = exclusion.ObjectID
AND exclusion.AttributeName = 'memberExclusions'
AND inclusion.MemberID = exclusion.ValueReference
WHERE
    inclusion.ObjectID = '8A112A70-14D0-40A9-803B-
    87D1AA764D0C'
AND inclusion.AddTime < exclusion.DeleteTime
UNION ALL
```

Predicate inclusion members with an entry in the memberExclusions attribute and the inclusion range comes after the exclusion range includes:

```
SELECT
    inclusion.ObjectID    ObjectID,
    inclusion.MemberID    MemberID,
    CASE
WHEN inclusion.AddTime >= exclusion.DeleteTime
THEN inclusion.AddTime
ELSE exclusion.DeleteTime
END                       AddTime,
    CASE
WHEN inclusion.AddTime >= exclusion.DeleteTime
THEN inclusion.AddCause
ELSE exclusion.DeleteCause
END                       AddCause,
    inclusion.DeleteTime   DeleteTime,
    inclusion.DeleteCause  DeleteCause
FROM BaseInclusionView inclusion
JOIN EnumeratedObjects exclusion ON
    inclusion.ObjectID = exclusion.ObjectID
AND exclusion.AttributeName = 'memberExclusions'
AND inclusion.MemberID = exclusion.ValueReference
WHERE
    inclusion.ObjectID = '8A112A70-14D0-40A9-803B-87D1AA764D0C'
AND exclusion.DeleteTime < inclusion.DeleteTime
```

The view for John Doe's Extended Staff can be defined as follows:

```
View                                                         name:
PredicateMembershipRule__C2B502C1__368C__44A6__83D0__
EACAE414EFE6
WITH JohnDoeStaff (ObjectID) AS
(
SELECT member.ObjectID FROM EnumeratedObjects member
    WHERE   member.ValueReference   =   '5D6F3249-B729-
4DE9-9D64-E14378C21995'
    AND member.AttributeName = 'manager'
    UNION ALL
        SELECT member.ObjectID FROM EnumeratedObjects member
        JOIN JohnDoeStaff s ON member.ValueReference = s.ObjectID
    AND member.AttributeName = 'manager'
),
    BaseInclusionView(ObjectID, MemberID, AddTime, AddCause,
DeleteTime, DeleteCause) AS
(
SELECT DISTINCT
    CAST('C2B502C1-368C-44A6-83D0-EACAE414EFE6' AS
uniqueidentifier) ObjectID,
        member.ObjectID        MemberID,
    CASE
    WHEN member.AddTime >= CAST('Oct 31 8:49PM' AS datetime)
    THEN member.AddTime
    ELSE CAST('Oct 31 8:49PM' AS datetime)
    END                    AddTime,
        CAST('C2B502C1-368C-44A6-83D0-EACAE414EFE6' AS
uniqueidentifier) AddCause,
    CASE
    WHEN    member.DeleteTime   <=   'Jan   1   9999   12:00AM'
    THEN member.DeleteTime
    ELSE 'Jan 1 9999 12:00AM'
    END                    DeleteTime,
        CAST(NULL AS uniqueidentifier) DeleteCause
    FROM EnumeratedObjects member
    JOIN JohnDoeStaff s ON s.ObjectID = member.ObjectID
)
```

The following description handles interaction between the group's predicate inclusion rule and the group's memberExclusions attribute.

Predicate inclusion members with no entry in the memberExclusions attribute includes:

```
SELECT *
FROM BaseInclusionView inclusion
WHERE inclusion.MemberID NOT IN
(
    SELECT exclusion.ValueReference FROM EnumeratedObjects
    exclusion
    WHERE exclusion.AttributeName = 'memberExclusions'
    AND exclusion.ObjectID = 'C2B502C1-368C-44A6-83D0-
    EACAE414EFE6'
)
UNION ALL
```

Predicate inclusion members with an entry in the memberExclusions attribute and the inclusion range comes before the exclusion range includes:

```
SELECT
    inclusion.ObjectID    ObjectID,
    inclusion.MemberID    MemberID,
    inclusion.AddTime     AddTime,
    inclusion.AddCause    AddCause,
    CASE
    WHEN   inclusion.DeleteTime   <=   exclusion.AddTime   THEN
inclusion.DeleteTime
```

```
    ELSE exclusion.AddTime
    END                     DeleteTime,
      CASE
    WHEN    inclusion.DeleteTime  <=  exclusion.AddTime  THEN
inclusion.DeleteCause
    ELSE exclusion.AddCause
    END                     DeleteCause
FROM BaseInclusionView inclusion
JOIN EnumeratedObjects exclusion ON
    inclusion.ObjectID = exclusion.ObjectID
AND exclusion.AttributeName = 'memberExclusions'
AND inclusion.MemberID = exclusion.ValueReference
WHERE
    inclusion.ObjectID = 'C2B502C1-368C-44A6-83D0-
    EACAE414EFE6'
AND inclusion.AddTime < exclusion.DeleteTime
UNION ALL
```

Predicate inclusion members with an entry in the member-Exclusions attribute and the inclusion range comes after the exclusion range includes:

```
SELECT
    inclusion.ObjectID     ObjectID,
    inclusion.MemberID     MemberID,
    CASE
WHEN inclusion.AddTime >= exclusion.DeleteTime
THEN inclusion.AddTime
ELSE exclusion.DeleteTime
END                        AddTime,
    CASE
WHEN inclusion.AddTime >= exclusion.DeleteTime
THEN inclusion.AddCause
ELSE exclusion.DeleteCause
END                        AddCause,
    inclusion.DeleteTime   DeleteTime,
    inclusion.DeleteCause  DeleteCause
FROM BaseInclusionView inclusion
JOIN EnumeratedObjects exclusion ON
    inclusion.ObjectID = exclusion.ObjectID
AND exclusion.AttributeName = 'memberExclusions'
AND inclusion.MemberID = exclusion.ValueReference
WHERE
    inclusion.ObjectID = 'C2B502C1-368C-44A6-83D0-EACAE414EFE6'
AND exclusion.DeleteTime < inclusion.DeleteTime
```

The view for All Managers can be defined as follows:

```
View                                                  name:
PredicateMembershipRule__62132177__50F3__4437__98D0__
FD7DE2B5497A
    WITH BaseInclusionView(ObjectID, MemberID, AddTime, AddCause,
DeleteTime, DeleteCause) AS
    (
    SELECT DISTINCT
        CAST('62132177-50F3-4437-98D0-FD7DE2B5497A'   AS
uniqueidentifier) ObjectID,
        member.ObjectID     MemberID,
        CASE
    WHEN member.AddTime >= CAST('Oct 31 8:49PM' AS datetime)
    THEN member.AddTime
    ELSE CAST('Oct 31 8:49PM' AS datetime)
    END                     AddTime,
        CAST('62132177-50F3-4437-98D0-FD7DE2B5497A'   AS
uniqueidentifier) AddCause,
        CASE
    WHEN   member.DeleteTime   <=   'Jan   1   9999   12:00AM'
    THEN member.DeleteTime
    ELSE 'Jan 1 9999 12:00AM'
    END                     DeleteTime,
        CAST(NULL AS uniqueidentifier) DeleteCause
```

```
    FROM EnumeratedObjects member
    WHERE member.ObjectID IN
    (SELECT  ValueReference  FROM  EnumeratedObjects  member
WHERE AttributeName = 'manager')
    )
```

The following description handles interaction between the group's predicate inclusion rule and the group's memberExclusions attribute.

Predicate inclusion members with no entry in the memberExclusions attribute includes:

```
SELECT *
FROM BaseInclusionView inclusion
WHERE inclusion.MemberID NOT IN
(
    SELECT exclusion.ValueReference FROM EnumeratedObjects
    exclusion
    WHERE exclusion.AttributeName = 'memberExclusions'
    AND exclusion.ObjectID = '62132177-50F3-4437-98D0-
    FD7DE2B5497A'
)
UNION ALL
```

Predicate inclusion members with an entry in the memberExclusions attribute and the inclusion range comes before the exclusion range includes:

```
SELECT
    inclusion.ObjectID   ObjectID,
    inclusion.MemberID   MemberID,
    inclusion.AddTime    AddTime,
    inclusion.AddCause   AddCause,
    CASE
  WHEN    inclusion.DeleteTime  <=   exclusion.AddTime   THEN
inclusion.DeleteTime
    ELSE exclusion.AddTime
    END                  DeleteTime,
    CASE
  WHEN    inclusion.DeleteTime  <=   exclusion.AddTime   THEN
inclusion.DeleteCause
    ELSE exclusion.AddCause
    END                  DeleteCause
FROM BaseInclusionView inclusion
JOIN EnumeratedObjects exclusion ON
    inclusion.ObjectID = exclusion.ObjectID
AND exclusion.AttributeName = 'memberExclusions'
AND inclusion.MemberID = exclusion.ValueReference
WHERE
    inclusion.ObjectID = '62132177-50F3-4437-98D0-
    FD7DE2B5497A'
AND inclusion.AddTime < exclusion.DeleteTime
UNION ALL
```

Predicate inclusion members with an entry in the memberExclusions attribute and the inclusion range comes after the exclusion range includes:

```
SELECT
    inclusion.ObjectID     ObjectID,
    inclusion.MemberID     MemberID,
    CASE
WHEN inclusion.AddTime >= exclusion.DeleteTime
THEN inclusion.AddTime
ELSE exclusion.DeleteTime
END                        AddTime,
```

-continued

```
CASE
WHEN inclusion.AddTime >= exclusion.DeleteTime
THEN inclusion.AddCause
ELSE exclusion.DeleteCause
END                    AddCause,
   inclusion.DeleteTime    DeleteTime,
   inclusion.DeleteCause   DeleteCause
FROM BaseInclusionView inclusion
JOIN EnumeratedObjects exclusion ON
   inclusion.ObjectID = exclusion.ObjectID
AND exclusion.AttributeName = 'memberExclusions'
AND inclusion.MemberID = exclusion.ValueReference
WHERE
   inclusion.ObjectID = '62132177-50F3-4437-98D0-FD7DE2B5497A'
AND exclusion.DeleteTime < inclusion.DeleteTime
```

The view for Full Time Employees can be described as follows:

```
View                                       name:
PredicateMembershipRule_BE740FF6_8C80_4B75_9A33_
5799F9C5F42A
   WITH   BaseInclusionView(ObjectID,  MemberID,  AddTime,
AddCause, DeleteTime, DeleteCause) AS
   (
   SELECT DISTINCT
      CAST('BE740FF6-8C80-4B75-9A33-5799F9C5F42A' AS
uniqueidentifier) ObjectID,
      member.ObjectID       MemberID,
      CASE
      WHEN member.AddTime >= CAST('Oct 31 8:50PM' AS datetime)
      THEN member.AddTime
      ELSE CAST('Oct 31 8:50PM' AS datetime)
      END                   AddTime,
      CAST('BE740FF6-8C80-4B75-9A33-5799F9C5F42A' AS
uniqueidentifier) AddCause,
      CASE
      WHEN   member.DeleteTime  <=  'Jan  1  9999  12:00AM'
THEN member.DeleteTime
      ELSE 'Jan 1 9999 12:00AM'
      END                   DeleteTime,
      CAST(NULL AS uniqueidentifier) DeleteCause
   FROM EnumeratedObjects member
   WHERE member.AttributeName = 'objectType' AND
member.ValueString = 'FullTimeEmployee'
   )
```

The following description handles interaction between the group's predicate inclusion rule and the group's memberExclusions attribute.

Predicate inclusion members with no entry in the memberExclusions attribute includes:

```
SELECT *
FROM BaseInclusionView inclusion
WHERE inclusion.MemberID NOT IN
(
   SELECT exclusion.ValueReference FROM EnumeratedObjects
   exclusion
   WHERE exclusion.AttributeName = 'memberExclusions'
   AND exclusion.ObjectID = 'BE740FF6-8C80-4B75-9A33-
   5799F9C5F42A'
)
UNION ALL
```

Predicate inclusion members with an entry in the memberExclusions attribute and the inclusion range comes before the exclusion range includes:

```
SELECT
   inclusion.ObjectID    ObjectID,
   inclusion.MemberID    MemberID,
   inclusion.AddTime     AddTime,
   inclusion.AddCause    AddCause,
   CASE
   WHEN    inclusion.DeleteTime  <=  exclusion.AddTime  THEN
inclusion.DeleteTime
   ELSE exclusion.AddTime
   END                   DeleteTime,
   CASE
   WHEN    inclusion.DeleteTime  <=  exclusion.AddTime  THEN
inclusion.DeleteCause
   ELSE exclusion.AddCause
   END                   DeleteCause
FROM BaseInclusionView inclusion
JOIN EnumeratedObjects exclusion ON
   inclusion.ObjectID = exclusion.ObjectID
AND exclusion.AttributeName = 'memberExclusions'
AND inclusion.MemberID = exclusion.ValueReference
WHERE
   inclusion.ObjectID =
'BE740FF6-8C80-4B75-9A33-5799F9C5F42A'
   AND inclusion.AddTime < exclusion.DeleteTime
UNION ALL
```

Predicate inclusion members with an entry in the memberExclusions attribute and the inclusion range comes after the exclusion range includes:

```
SELECT
   inclusion.ObjectID    ObjectID,
   inclusion.MemberID    MemberID,
   CASE
WHEN inclusion.AddTime >= exclusion.DeleteTime
THEN inclusion.AddTime
ELSE exclusion.DeleteTime
END                     AddTime,
   CASE
WHEN inclusion.AddTime >= exclusion.DeleteTime
THEN inclusion.AddCause
ELSE exclusion.DeleteCause
END                     AddCause,
   inclusion.DeleteTime    DeleteTime,
   inclusion.DeleteCause   DeleteCause
FROM BaseInclusionView inclusion
JOIN EnumeratedObjects exclusion ON
   inclusion.ObjectID = exclusion.ObjectID
AND exclusion.AttributeName = 'memberExclusions'
AND inclusion.MemberID = exclusion.ValueReference
WHERE
   inclusion.ObjectID = 'BE740FF6-8C80-4B75-9A33-5799F9C5F42A'
AND exclusion.DeleteTime < inclusion.DeleteTime
```

The system 100 can be implemented as part of networked, distributed, or other computer-implemented environment. The system 100 and its components can communicate via a wired, wireless, and/or a combination of communication networks. A number of client computing devices, including desktop computers, laptops, handhelds, or other smart devices can interact with and/or be included as part of the system 100. In alternative embodiments, the various components can be combined and/or configured according to a desired implementation. For example, the organizing component 104 and/or query component 106 can be included as part of the database system 102. Other embodiments and configurations are available.

As described above, defined groups can be used for many purposes. For example, groups can be used: when sending an e-mail to multiple people; for granting access rights, identifying multiple people as the principle; for granting access rights, identifying multiple targets of an action; etc. A predicate-based membership can be used to eliminate the additional management action of adding or removing a member from an associated group. As soon as a member of a group is stored in the database, the member can be automatically and immediately in the group because the member can be included using a defined group-membership predicate. Once a member is no longer associated with a group, the member can be automatically and immediately disassociated with the group as stored in the database.

A predicate-based group is not only defined as a predicate, it exists as a predicate. Thus, a predicate-based group will be automatically up-to-date. In an embodiment, the predicate is not used to cache associated members. Rather, as described above, a predicate defining a group can be maintained using a database view. Correspondingly, a query using the database view gets the up-to-date membership since caching of the members is not required. Moreover, the complexity and overhead associated with cache invalidation can be avoided. Constantly checking whether an update to the database invalidates the cached group membership can require complex error-prone programming as well as a very large processing overhead. In some cases, a group can be used to test membership, so that producing the set of members in not necessary, resulting in better performance.

Exemplary Operating Environment

Figure 4:
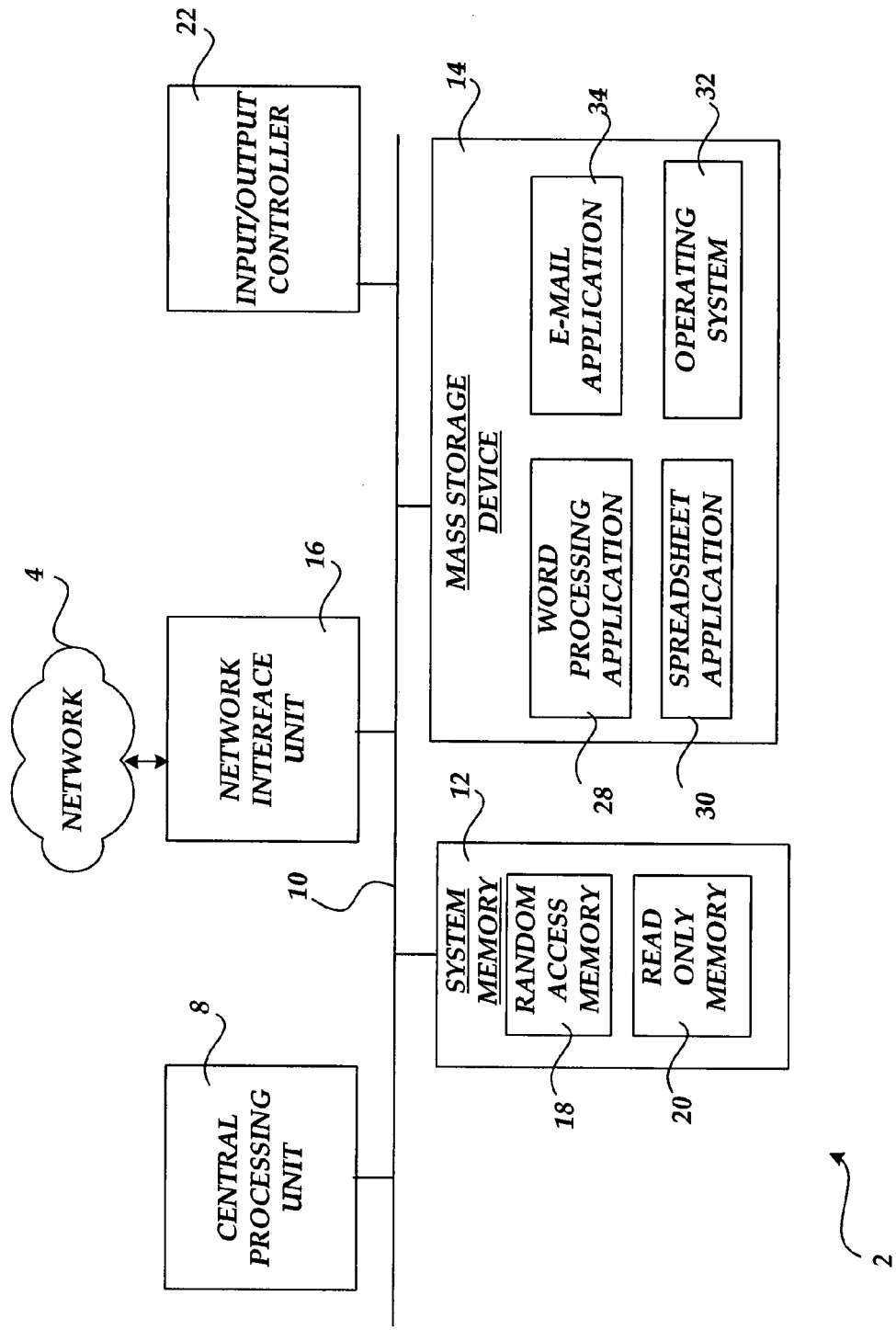
FIG. 4 is a block diagram illustrating a computing environment for implementation of various embodiments described herein.

Referring now to FIG. 4, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 4, an illustrative operating environment for embodiments of the invention will be described. As shown in FIG. 4, computer 2 comprises a general purpose desktop, laptop, handheld, or other type of computer capable of executing one or more application programs. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20. The computer 2 further includes a mass storage device 14 for storing an operating system 32, application programs, and other program modules.

The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 4, such as a local network, the Internet, etc. for example. The computer 2 may connect to the network 4 through a network interface unit 16 connected to the bus 10. It should be appreciated that the network interface unit 16 may also be utilized to connect to other types of networks and remote computing systems. The computer 2 may also include an input/output controller 22 for receiving and processing input from a number of other devices, including a keyboard, mouse, etc. (not shown). Similarly, an input/output controller 22 may provide output to a display screen, a printer, or other type of output device.

As mentioned briefly above, a number of program modules and data files may be stored in the mass storage device 14 and RAM 18 of the computer 2, including an operating system 32 suitable for controlling the operation of a networked personal computer, such as the WINDOWS operating systems from MICROSOFT CORPORATION of Redmond, Wash. The mass storage device 14 and RAM 18 may also store one or more program modules. In particular, the mass storage device 14 and the RAM 18 may store application programs, such as a word processing application 28, a spreadsheet application 30, e-mail application 34, drawing application, etc.

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A computer readable storage medium including executable instructions for generating a database view that integrates a number of predicate-based views with a number of enumerated groups, said executable instructions when executed by a computer causes a processor to perform a method comprising:
    defining a predicate-based group, wherein the predicate-based group includes a number of group members;
    creating a predicate-based rule for the predicate-based group using a logical schema that includes a group identifier associated with the predicate-based group, wherein said predicate based rule defines an inclusion interval associated with the predicate-based rule and an exclusion interval associated with the predicate-based rule, and wherein said predicate based rule indicates when the predicate-based rule is created;
    creating a predicate-based data structure based in part on the predicate-based rule, wherein the predicate-based data structure includes the number of group members associated with the predicate-based group;
    creating a predicate membership data structure that includes the predicate-based data structure;
    defining a number of enumerated groups including a number of enumerated objects, wherein the number of enumerated group members creates an integrated data structure which includes the predicate membership data structure;
    generating a predicate membership view based in part on the membership rule and a union of a number of predicate based group views; and
    generating an objects view including information associated with the predicate membership view and the number of enumerated objects.

2. The computer-readable storage medium of claim 1, further comprising querying the integrated data structure using a defined query.

3. The computer-readable storage medium of claim 1, further comprising translating the predicate-based rule from a first language to a second language.

4. The computer-readable storage medium of claim 1, further comprising indicating when the predicate-based rule is deleted.

5. The computer-readable storage medium of claim 1, further comprising indicating a reason for creating the predicate-based rule.

6. The computer-readable storage medium of claim 4, further comprising indicating a reason for deleting the predicate-based rule.

7. The computer-readable storage medium of claim 1, further comprising regenerating the predicate membership view by using a number of stored procedures to modify a predicate membership rules table.

8. A system for generating a database view that integrates a number of predicate-based views with a number of enumerated groups, the system comprising:
    an organization component to define one or more membership rules for a number of group members;
    a database component including a predicate rules table and an enumerated objects table for storing information associated with the number of group members, wherein the database component is configured to provide an integrated view including information associated with the predicate rules table and the enumerated objects table, wherein the database component comprises a logical schema including a group identifier associated with a predicate-based group and a member object, wherein said logical schema is used to generate predicate membership information;
    an organization component to create a predicate-based rule for the predicate-based group using the logical schema;
    an organization component to define a number of enumerated group members including a number of enumerated objects, wherein the number of enumerated group members creates an integrated data structure which includes a predicate membership data structure;
    an organization component to create a predicate-based data structure based in part on the predicate based rule including the number of group members associated with the predicate-based group;
    an organization component to generate a predicate membership view based in part on the membership rule and a union operation which includes the union of a number of predicate based group views; and
    an organization component to generate an objects view including information associated with the predicate membership view and the number of enumerated objects.

9. The system of claim 8, wherein the database component is configured to provide a predicate membership view to include a member attribute having a reference type.

10. The system of claim 9, wherein the database component is further configured to provide the predicate membership view using predicate calculus.

11. A method of generating a database view that integrates a number of predicate-based views with a number of enumerated groups, the method comprising:
    defining a predicate-based group, wherein the predicate-based group includes a number of group members, wherein said predicate based group is configured to include a number of member inclusion attribute values and a number of member exclusion attribute values;
    defining a membership rule associated with a group, wherein the membership rule includes a number of predicate-based membership parameters and an indicator to identify the group member that is associated with the membership rule;
    creating a predicate-based data structure based in part on the predicate-based rule, wherein the predicate-based data structure includes the number of group members associated with the predicate-based group;
    creating a predicate membership data structure that includes the predicate-based data structure;
    defining a number of enumerated groups including a number of enumerated objects; generating a predicate membership view based in part on the membership rule;
    generating an objects view including information associated with the predicate membership view and the number of enumerated objects; and
    generating a predicate membership view using a union operation which includes the union of a number of predicate based group views.

12. The method of claim 11, further comprising performing a query on the object view including using a number of query predicates as part of the query.

* * * * *